(No Model.)
L. L. JONES.
ELECTRODE AND INCANDESCENT ELECTRIC CONDUCTOR.
No. 484,553. Patented Oct. 18, 1892.
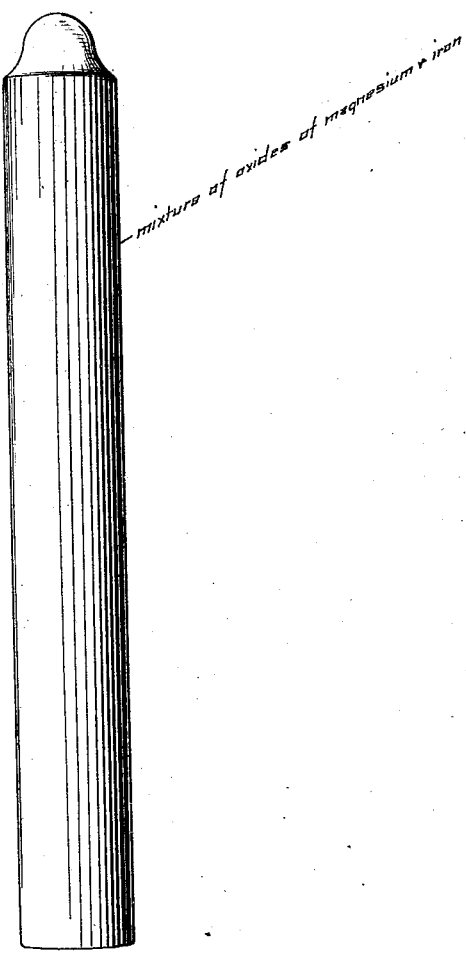
WITNESSES:
C. Sedgwick
A. H. Davis
INVENTOR:
L. L. Jones
BY Munn & Co.
ATTORNEYS.

UNITED STATES PATENT OFFICE.

LEWIS L. JONES, OF BROOKLYN, NEW YORK.

ELECTRODE AND INCANDESCENT ELECTRICAL CONDUCTOR.

SPECIFICATION forming part of Letters Patent No. 484,553, dated October 18, 1892.

Application filed September 16, 1885. Serial No. 177,281. (No specimens.)

*To all whom it may concern:*

Be it known that I, LEWIS L. JONES, of the city of Brooklyn, county of Kings, and State of New York, have invented a new and useful Improvement in Electrodes and Incandescent Conductors for Electrical Purposes and the Method of Manufacturing the Same, of which the following is a full, clear, and exact description.

My invention relates to the manufacture of such electrodes and conductors from a mixture of refractory earthy substances with metallic conducting substances; and my improvement consists, first, in the method of uniting these substances more closely and uniformly than is possible in a mere mechanical mixture; second, the employment of a suitable substance to combine with the said mixture to form a plastic mass for molding in the form desired, and, third, the completed article of manufacture. In the manufacture of such electrodes and conductors any earthy and any metallic substance or substances which may be found suitable for my purpose may be employed, but in describing the method of carrying my invention into effect I will assume that magnesia and iron oxide are the substances to be used, they having been found suitable, and, being well known, will fairly illustrate my invention. If an aqueous solution of magnesium sulphate be thoroughly mixed with an aqueous solution of iron sulphate and a proper precipitant (ammonia, soda, &c.) be added, with heat, there will be thrown down a hydrate, which when washed, dried, ignited, and ground to powder will be converted into an oxide of magnesium and iron, perhaps not technically entitled to be called the "double oxide," but certainly possessing for my purpose all the desirable qualities of a chemical combination, as the mixture is uniform throughout the mass and the finished substance is so homogeneous that its component parts cannot be separated without decomposing it. The same result may be obtained by dissolving the oxides, carbonates, and other compounds of magnesium and iron in hydrochloric acid, thoroughly agitating the solution, evaporating to dryness, igniting, and grinding the mass to powder; and any other process known in the art may be followed.

From a powder containing magnesium oxide ninety per cent. and iron oxide ten per cent. I have made arc-light pencils which possessed many advantages over the carbon pencils now in general use—viz., increased life and greater brilliancy and steadiness of the light; but the proportions of the constituents may vary with the substances used, the forms to be molded, and their intended purpose. In the manufacture of such forms some binding or adhesive substance must be used with the powder to make a plastic mass of proper consistency for molding into shape, and such binder must be for the purposes of my invention capable of hardening into a homogeneous and tenacious bond in the subsequent baking. I have obtained good results from the use of a binding solution prepared by dissolving magnesia alone in acetic acid and evaporating the solution to a sirupy consistency; also, by dissolving in acetic acid the magnesium iron hydrate obtained by precipitation, as hereinbefore described, and evaporating the solution to a sirupy consistency. I have also obtained good results by dissolving such substances in hydrochloric acid and evaporating to proper density. These binding solutions differ greatly in character, cost, and operation; but all are effective. I prefer a solution of salts corresponding to those of the double-oxide powder with which it is to be combined, as a pencil or any form of conductor composed of such materials will when completed by baking be practically homogeneous and a uniformly-continuous conductor of electricity. The plastic mass so prepared may be molded under pressure and drawn or otherwise formed into electrodes or points for arc lights and incandescing conductors for all electrical purposes by any suitable apparatus or process known in the art. For some purposes the forms thus prepared may be finished at once by subjecting them to such heat as to secure the desired hardness, density, and conductivity; but points for arc lights require further treatment, because after being molded into form, dried, and baked they will not be sufficiently-good conductors. I therefore introduce another step, which may be before or after such baking. After drying at a moderate heat I soak the pencils in a strong solution of iron—such, for instance, as a saturated aqueous solution of protosulphate of iron—and then subject them to a very full heat. The baking reduces the iron compound throughout the mass to the peroxide, which is a moderate conductor of electricity; but it is still desirable, as in the case of carbon pencils, to further increase the conductivity by surface treatment. High heat will, if continued, reduce the peroxide to the magnetic oxide in the mass; but I prefer to pack the dipped pencils in powdered carbon and then bake at a high heat. The presence of carbon will reduce the oxide at the surface and produce a film of metallic iron, upon which, if desired, a copper coating may be deposited in the usual manner.

Important results follow from the foregoing process in the production of electrical conductors, such as arc-light pencils and filamentary conductors for incandescent lights. First, the conductor can be made to consist principally of the most refractory substances commercially known, such as magnesia or alumina, while at the same time any desired degree of conductivity may be primarily imparted to this otherwise non-conducting body by the incorporation therewith of an oxide which is a conductor. The mode of bringing these two bodies together insures a most perfect and homogeneous union, such that the pencil or filament cannot be considered as made up of non-conducting portions intervening with conducting portions, such as would be the case were the article made up of a core of metal surrounded with a coating of non-conducting oxide, or as would be the case were a pencil or filament to be made primarily of a porous non-conducting oxide having its pores filled with a conducting substance of any kind. In the former case supposed the surrounding coating of oxide would not be a conductor at all, and hence could not serve as the filament for an incandescent light. In the second case supposed the pencil or filament would be composed of a primary structure of non-conducting material whose pores would be filled with a conducting substance, obviously, however, without continuity of the latter. In my case, on the contrary, the continuity of conductivity is assured by the primary structure being a homogeneous and intimate union of the non-conducting substance with the conducting substance, and the relative value of the latter is increased by the presence of additional conducting substance in the pores of the primary conducting structure. This, so far as known to me, is a new result and has a very obvious bearing on the lasting quality of the product when in use. The hardness and density of the conductor and its incombustibility, owing to its refractory nature, permit of a small cross-section being employed, and hence the attainment of a high temperature and great efficiency becomes practicable.

I have described by way of illustration a pencil made up of magnesium oxide and iron oxide, with or without a surface deposit of metallic iron; but I do not confine myself to such, as many other equivalent substances may be employed in analogous combination without departing from the spirit of my invention. For example, instead of magnesia I may use alumina, zirconia, lime, or other oxide of the earthy metals, which for the purpose of this specification I designate as "refractory oxides," which are practically non-conductors of electricity, and instead of iron oxide I may use an oxide of nickel, zinc, platinum, tin, or other metal which is more or less conductive of electricity and which I term a "metallic oxide."

Certain parts of my invention might be varied without departing from its spirit. For example, although I prefer to form the mixture primarily by intermingling solutions, because a perfectly-homogeneous mass results from such treatment, a more or less perfect mixture might be made by stirring together powdered ingredients and then treating the resulting product in accordance with the process hereinbefore described.

I claim as my invention—

1. In the manufacture of electrodes and incandescent electrical conductors, the process consisting in mixing solutions containing a non-conducting earth and a metal, then drying the mixture, converting into oxides, and forming into an electrode or conductor.

2. In the manufacture of electrodes and incandescent electrical conductors, the improvement consisting in forming a paste composed of a refractory or non-conducting oxide, a metallic or conducting oxide, and a fluid binder consisting of an acid solution of one or more oxides and forming the article therefrom.

3. In the manufacture of electrodes and incandescent electrical conductors, the improvement consisting in forming a paste composed of a refractory or non-conducting oxide, a metallic or conducting oxide, and a fluid binder consisting of the acid solution of two oxides, one refractory or non-conducting, the other metallic and conducting, and forming the article therefrom.

4. The described process of manufacturing electrodes and incandescent electrical conductors, consisting in first forming the article from a paste composed of a refractory and a metallic oxide and an acid solution of one or more oxides, then drying the article, and subjecting it to a high heat.

5. The described process of manufacturing electrodes and incandescent electrical conductors, consisting in first forming the article from a paste composed of a refractory and a metallic oxide and an acid solution of one or more oxides, then drying the article, dipping it in a metallic solution, and finally subjecting it to a high heat.

6. The described process of manufacturing electrodes and incandescent electrical conductors, consisting in first forming the article from a paste composed of a refractory and a metallic oxide and an acid solution of one or more oxides, then drying the article, dipping it in a metallic solution, and finally subjecting it to a high heat in surface contact with a reducing substance, such as carbon.

7. The described electrode or incandescent electrical conductor, composed of a homogeneous mixture of refractory or non-conducting oxide and metallic or conducting oxide, forming an integral structure, having near the surface an increased deposit of conducting oxide.

8. The described electrode or incandescent electrical conductor, composed of refractory or non-conducting oxide and metallic or conducting oxide, forming an integral structure, having its pores filled with conducting oxide and its surface coated with a metal.

LEWIS L. JONES.

Witnesses:
H. A. WEST,
C. SEDGWICK.